United States Patent
Heimler et al.

(10) Patent No.: US 12,045,626 B2
(45) Date of Patent: Jul. 23, 2024

(54) DYNAMIC PLUG AND PLAY RESOURCE DISCOVERY

(71) Applicant: SAP SE, Walldorf (DE)

(72) Inventors: Simon Heimler, Coswig (DE); Sebastian Wennemers, Mannheim (DE)

(73) Assignee: SAP SE, Walldorf (DE)

( * ) Notice: Subject to any disclaimer, the term of this patent is extended or adjusted under 35 U.S.C. 154(b) by 1 day.

(21) Appl. No.: 17/830,737

(22) Filed: Jun. 2, 2022

(65) Prior Publication Data

US 2023/0393857 A1    Dec. 7, 2023

(51) Int. Cl.
*G06F 9/4401*    (2018.01)
*G06F 9/445*     (2018.01)
*G06F 9/54*      (2006.01)

(52) U.S. Cl.
CPC ........ *G06F 9/4413* (2013.01); *G06F 9/44505* (2013.01); *G06F 9/541* (2013.01)

(58) Field of Classification Search
None
See application file for complete search history.

(56) References Cited

U.S. PATENT DOCUMENTS

| | | | |
|---|---|---|---|
| 8,990,838 B2* | 3/2015 | Li | G06F 9/4411 719/327 |
| 2003/0167270 A1* | 9/2003 | Werme | G06F 9/505 |
| 2016/0182652 A1* | 6/2016 | Bevilacqua | G06F 9/546 709/203 |
| 2016/0234140 A1* | 8/2016 | Sirpal | H04N 21/4516 |
| 2017/0063566 A1* | 3/2017 | Seminario | H04L 67/12 |
| 2017/0093640 A1* | 3/2017 | Subramanian | H04L 41/5058 |
| 2023/0176877 A1* | 6/2023 | Heimler | G06F 9/44505 713/1 |

* cited by examiner

*Primary Examiner* — Michael Sun
(74) *Attorney, Agent, or Firm* — SCHWEGMAN LUNDBERG & WOESSNER, P.A.

(57) ABSTRACT

In an example embodiment, a technique is disclosed to describe generic capabilities in the ORD standard. In addition, this new ORD resource type may be explicitly supported by a Central ORD aggregator (or Central Management Plane), which can be used to discover and retrieve the information centrally. Having a central metadata service also eliminates the need for many point-to-point integrations.

20 Claims, 10 Drawing Sheets

DYNAMIC PLUG AND PLAY RESOURCE DISCOVERY

BACKGROUND

Software companies can offer a variety of products and applications that may be integrated in some way with each other (e.g., data may be shared, objects existing in one product may be accessible in another, etc.). It is useful for such systems to have the ability to automatically share metadata between them.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
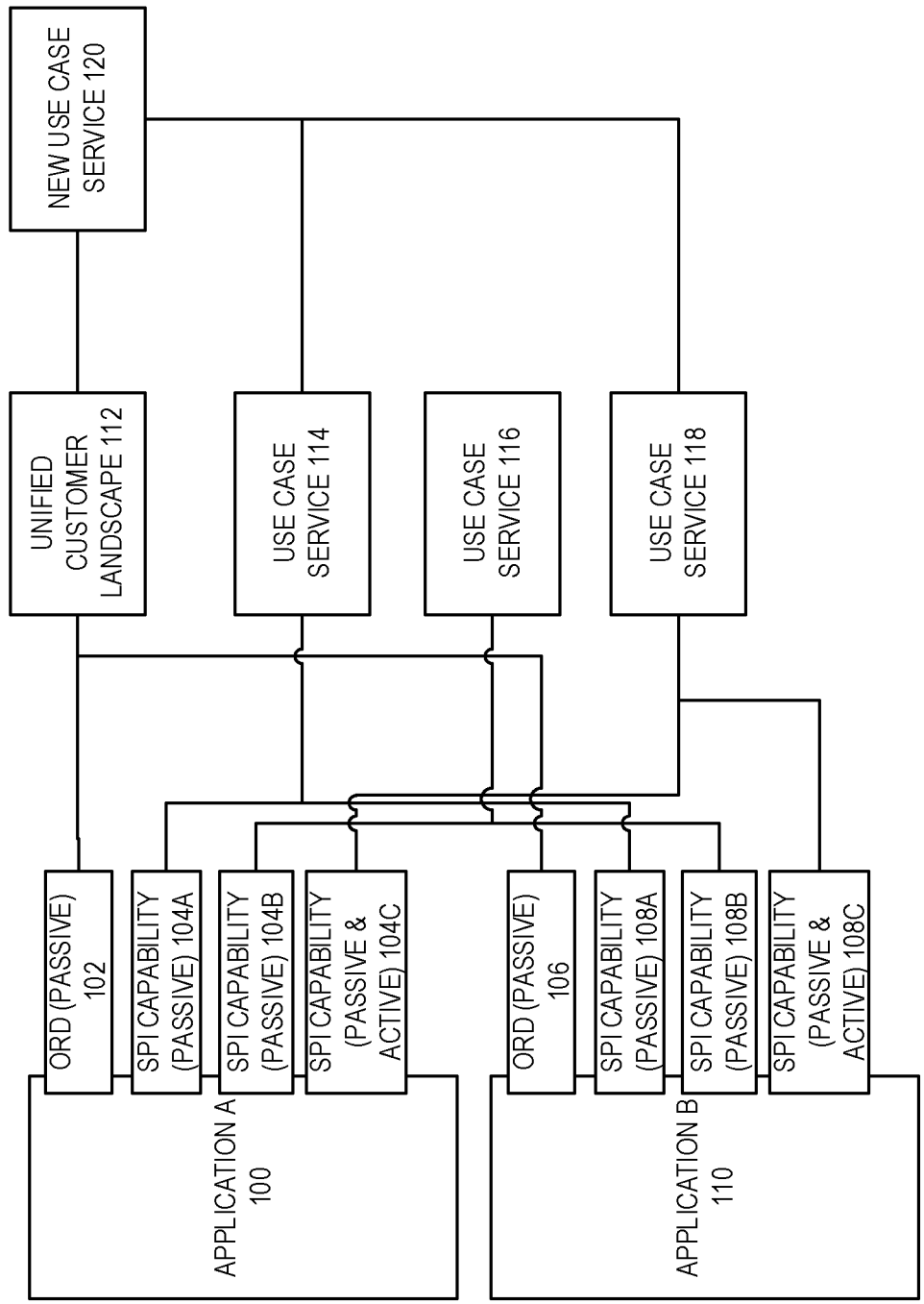
FIG. 1 is a block diagram illustrating an example Open Resource Discovery (ORD) architecture without capability discover.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

One way to implement resource information sharing is to create a system for discovering, representing, and exposing various types of APIs.

APIs can include, for example, programming interfaces (including events) that serve as the building blocks to support extensions and integrations from a computer application in a third-party system or language. However, each source system that provides APIs may have different ways to expose the metadata associated with APIs and events. The metadata can define, for example, a library of available APIs and information about what each API does, how the API is called (and used), and what the expected results include. Information about APIs can be provided online, for example, as API libraries or catalogs. However, some systems may not have ways of exposing the metadata regarding their APIs. Without knowing which APIs and events are available from (or exposed by) a system, it can be difficult for software engineers, for example, to build extensions or integrations that use the APIs. Existing conventional approaches involve publishing API metadata can rely on, for example, a) documentation b) custom API catalogs (for example, SAP's Gateway Catalog Service), and c) hypermedia APIs such as OData. Moreover, conventional approaches may not scale easily or may make it difficult to build extensions and integrations in a heterogeneous landscape. Additionally, some tools (such as web integrated development environment (Business Application Studio or WebIDE), Mobile Software Development Kit (SDK), Cloud Platform Integration, API Management, and Enterprise Messaging) do not have standard ways to discover APIs and events.

Systems that involve the use of APIs are typically heterogeneous. For example, APIs may provide access to data processes and transactions that are distributed across multiple systems. Typically, APIs are exposed as standard APIs, as there is no common view of all the different APIs that are available from multiple systems. One way for API providers to expose their APIs, events, and connection information would be to use a common language for the discovery of APIs. For example, the Open Resource Discovery specification can standardize information and provide a uniform format used by tools that consume APIs to build applications or perform integration. This can be accomplished, for example, by collecting information about disparate APIs into a central location that presents the information in a standard format to API consumers. The information can then be provided through an Open Resource Discovery document API, for example.

In such an Open Resource Discovery system, an API interface contract is standardized, which is used to express the information that a particular use case requires. A use case may be defined as a consumer of capability metadata: namely some sort of service that needs to know capabilities of certain software. For example, if a central field extension service needs to discover extensibility capabilities such as the number of supported extension fields or available data types of a product, then an interface contract specific to that use case is created. This specific interface contract is called a Service Provider Interface (SPI). Likewise, if a central master data orchestration service needs to discover supported replication mechanisms, a separate SPI may be created for that use case.

Such an approach, however, comes with a significant adoption cost for each use case that relies on such capability discovery. As the number of such use cases increases constantly, a more scalable approach is desirable. Seen from an application and service perspective, being asked to implement and integrate many different and specific SPIs for each use case can cause wasted efforts and lead to resource problems.

Parts of the information from one use case may be useful to other consumers and use cases. In the worst case, the same applications and services are asked to implement different SPIs that mostly provide the same or at least substantially overlapping information, just in different ways. Many use cases do not rely only on one kind of metadata but need to combine many different types. If alignment across such use cases is not achieved, then applications and services are being asked to duplicate not only implementation efforts, but also information. Consumers that require different types of metadata would also benefit from such alignment, because they would need to integrate many different data sources and SPIs otherwise.

However, many use cases that demand an SPI rely also on very use case-specific information. Thus, it would be desirable to have an extensible, generic protocol that allows this use case-specific information to be expressed without creating a new protocol.

In an example embodiment, a technique is disclosed to describe generic capabilities in the ORD standard. In addition, this new ORD resource type may be explicitly supported by a central ORD aggregator, which can be used to discover and retrieve the information centrally. Having a central metadata service also eliminates the need for many point-to-point integrations.

In an example embodiment, generic capabilities are described at a high-level within ORD, but additional information is provided through a dedicated capability definition standard. The capability definition standard may be standardized by the user case owner(s), or it could be a shared standard across many parties. In ORD, the capability definitions can be referenced, typed, and included in the metadata discovery and aggregation process.

From the ORD and Central ORD aggregator perspective, such capability definitions can be treated as a "black box" and thus treated as arbitrary data. This ensures that adding new capability types or new capability definition types can be accomplished with little or no effort from the ORD or Central ORD aggregator side.

In an example embodiment, adding the generic capability resource type follows the conceptual and architectural patents of ORD introduced with API and event discovery.

In a further example embodiment, capabilities have a "visibility" that can be public, internal, or private. If they are public, they can also be officially documented on a central API catalog or other centralized source.

Some use cases rely on other types of metadata, which may already be a part of an ORD or Central ORD aggregator scope (such as API or event resources). In such a case, getting more interconnected information from a single metadata service with one aligned standard is especially helpful. It helps the use case to reduce the necessary integration points and also the work of connecting the information together on its own.

In an example embodiment, a distinction is made between passive capabilities and active capabilities. Passive capabilities are capabilities involving the retrieving of information. Active capabilities are capabilities involving invoking or controlling behavior. In an example embodiment, generic capability discovery is provided for passive capabilities but not for active capabilities. The result is that SPIs for passive capabilities can be eliminated, while SPIs for active capabilities remain.

FIG. 1 is a block diagram illustrating an example ORD architecture without capability discover. Here, Application A 100 (which is on a Line-of-Business side of a network) specifies a high-level ORD 102 as well as three separate SPIs 104A, 104B, 104C. Each SPI 104A, 104B, 104C provides capability information for a different use case, some of which might overlap among the SPIs 104A, 104B, 104C. Notably, while SPI 104A and 104B provide only passive capabilities, SPI 104C provides both passive and active capabilities. A similar ORD 106 and SPIs 108A, 108B, 108C are shown provided by Application B 110.

Central ORD aggregator 112 connects to ORD 102 and ORD 106. Use case service 114 connects to SPIs 104A, 108A. Use case service 116 connects to SPIs 104B, 108B. Use case service 118 connects to SPIs 104C, 108C. A new use case 120 is also depicted, which does not need its own SPI because it can reuse existing information from the other use case services 114, 116, 118.

Figure 2:
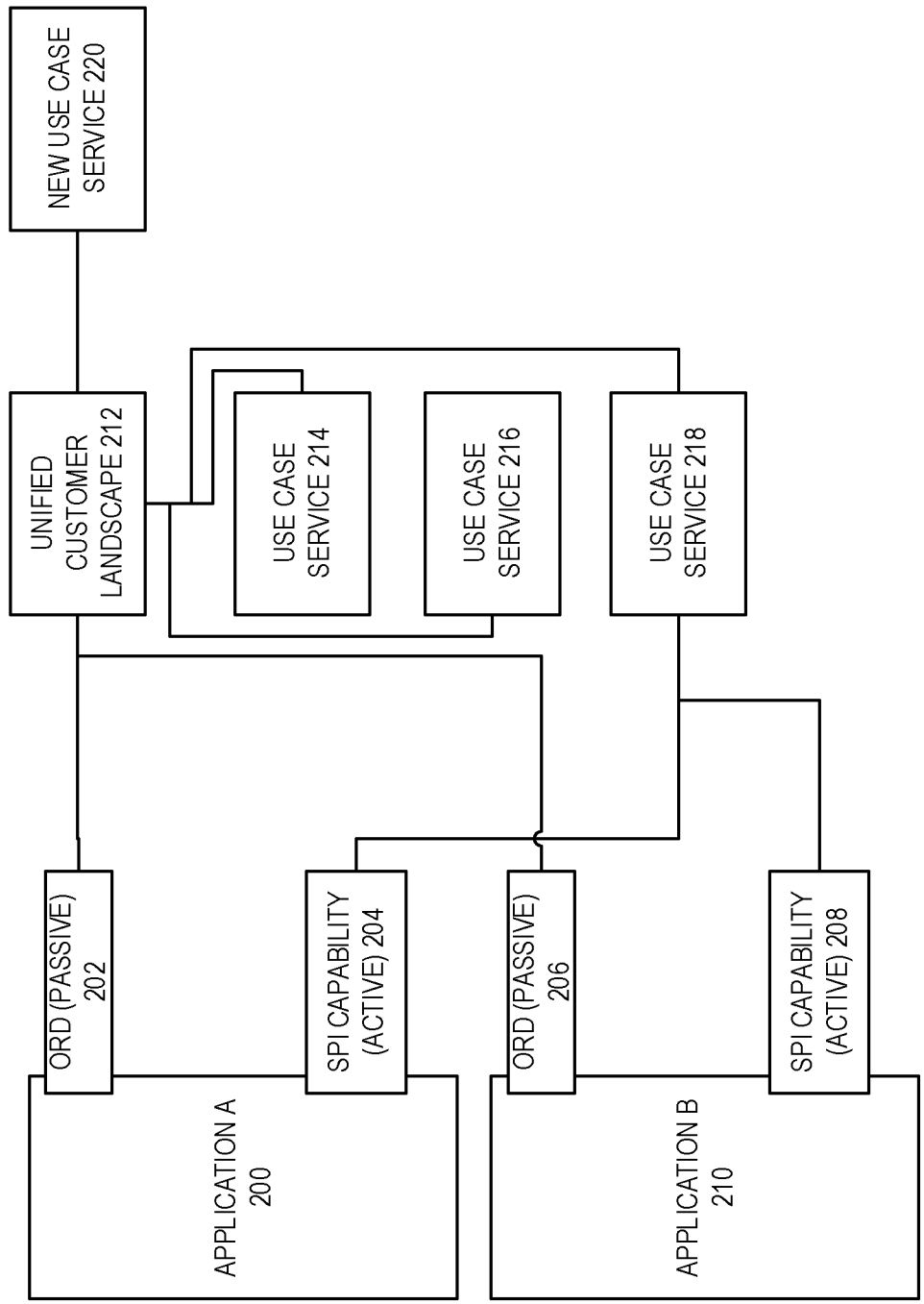
FIG. 2 is a block diagram illustrating an ORD architecture with capability discovery, in accordance with an example embodiment.

As mentioned above, in an example embodiment, the passive capability descriptions are put into the ORD protocol, eliminating the need for some of the SPIs. FIG. 2 is a block diagram illustrating an ORD architecture with capability discovery, in accordance with an example embodiment. Here, Application A 200 again specifies a high-level ORD 202, but only needs to specify a single SPI 204 for the active capabilities that were contained in SPI 104C of FIG. 1. Similarly, ORD 206 and SPI 208 (for just the active capabilities that were contained in SPI 108C of FIG. 1) are shown provided by Application B 210.

Again, Central ORD aggregator 212 connects to ORD 202 and ORD 206, but now use case services 214, 216, 218 require much fewer connections to the Line-of-Business side. Only use case 218 requires any connection at all to the Line-of-Business side, and only to SPIs 104 and 108. The other use cases 214, 216 need only connect to the Central ORD aggregator 212 (use case 218 also connects to the Central ORD aggregator 212 to obtain passive capabilities contained in SPI 104C, 108C of FIG. 1.

Furthermore, new use case 220 need only connect to Central ORD aggregator 212 and not directly to use case services 214, 216, and 218.

FIG. 2 depicts a system that uses no central alignment—namely a "custom type" capability is added to ORD without any need to standardize or add anything to the ORD specification. How the information is added correctly to the ORD capability can be agreed upon directly between stakeholders. This is useful for piloting or beta testing a new capability before omitting to a more stable contract and requires no dedicated support from the ORD or Central ORD aggregator side.

Information can be added via ORD extensibility properties, such as tags, labels, and relations directly. Alternatively, a "custom type" capability definition can be used and reconciled by the capability owner.

While it is technically possible to avoid central alignment completely, in many cases it may be preferable to go through a lightweight central alignment approach once a capability becomes more official or is used and defined by multiple stakeholders. At that point, the capability type will become standardized and part of the ORD specification. The capability type "enum" value can be used to describe the capability standard and link to the specification of the capability (which describes how it is to be provided and interpreted correctly). This specification can either be created and owned externally or be published as an independent ORD specification appendix.

In case an external definition file is needed, the corresponding definition type may be standardized and documented with a link to the official specification by the capability owner. The definition format may be defined formally. One way to do this is to utilize a Javascript™ Object Notation (JSON) schema. It can be used to not only document the expected document structure, but also to validate the capability definition documents for specification compliance. This lightweight central alignment only requires very minimal efforts on the ORD and Central ORD aggregator sides. The actual work of defining the capability can be externalized and decoupled. In other embodiments, the definition format may utilize another language, such as Extensible Markup Language (XML), Yet-Another-Markup-Language (YAML), or any arbitrary plain text or binary content.

The distinction between active and passive capabilities exists because ORD is limited to the task of declarative self-description. If active control of the providers is needed, it is implemented as an additional active SPI, complementing the read-only ORD capability discovery. However, with ORD, the overall specialized footprint of SPIs will still become smaller and easier to implement, as the passive part is effectively outsourced. Furthermore, passive capabilities are more likely to have overlap or synergy with other use cases than active capabilities.

Some use cases require very frequent updates to the capability discovery or the need to rely on many smaller delta updates. ORD supports a pull-based replication pattern, which might not be able to provide the sufficient qualities for such situations at a high level. However, the specification is designed to allow for the introduction of additional transport modes, such as push and event-based replication.

The following is an example of how a generic capability could look within an ORD document:

```
{
    "openResourceDiscovery": "1.0",
    // ...
    "capabilities": [
        {
            // Typical ORD properties that are shared by other resources as well
            "ordId": "sap.foo.bar:capability:foo:v1",
            "title": "MDI Capability",
            "type": "sap:masterDataIntegrationCapability:v1",
            "shortDescription": "<optional?>",
            "description": "<optional?>",
            "version": "1.0.0",
            "releaseStatus": "active",
            "visibility": "public",
            "partOfPackage": "sap.foo.bar:package:SomePackage:v1",
            // ORD properties that can be used for extensibility / flexible custom information
            "tags": [ ],
            "labels": [ ],
            "documentationLabels": [ ],
            "links": [ ],
            // We consider also adding generic custom relationships to ORD
            // Having this on ORD level would allow us to navigate relationships in the ORD Service
            "relations": [
                {
                    "ordId": "sap.s4.entity.BusinessPartner:v1",
                    "customType": "sap.mdi:providedEntity:v1",
                    "title": "provides entity for MD replication"
                }
            ],
            // Capability resource definition files
            "definitions": [
                {
                    "type": "sap:masterDataIntegrationCapabilityDefinition:v1",
                    "mediaType": "application/json",
                    // This file will be standardized according to the spec for "sap.foo.bar:non-standard-capability:v1"
```

```
                    // Here we can add the missing
                    "url": "/capabilities/mdi-capability.json",
                    "accessStrategies": [
                        {
                            "type": "open"
                        }
                    ]
                }
            ]
        }
    ]
}
```

The following is an example JSON document for a Medium Dependent Interface (MDI) capability definition, as referenced in the above ORD document:

```
{
    "mdiCapability": "1.0",
    "clientApiVersion": "1.9.0",
    "maxPackageSize": 50,
    "dppSupport": true,
    "ftdsSupport": false,
    "complexFilterSupport": true,
    "recurrencePatterns": ["PRESET", "IMMEDIATE", "MINUTES", "HOURLY", "DAILY", "WEEK", "MONTHLY"],
    "replicationModes": ["MANUAL", "INITIAL", "DELTA"],
    "$comment": "System can send/provide CostCenter, Product and BP. BP can be send by two different APIs",
    "providedObjectTypes": [
    ],
    "consumedObjectTypes": [
        {
            "entity": "sap.s4.entity.BusinessPartner:v1",
            "api": "MDI_SOAP_BUSINESS_PARTNER",
            "apiMode": "PULL",
            "localConfiguration": false
        },
        {
            "entity": "sap.s4.entity.BusinessPartner:v1",
            "api": "MDI_LOG_BUSINESS_PARTNER",
            "apiMode": "PULL",
            "localConfiguration": false
        }
    ]
}
```

In some implementations, discovery of APIs and related connection information can be performed automatically by machine-driven processes. For example, automated processes can crawl the Internet to obtain information about APIs, the interfaces, and connection information. Information that is obtained can become part of an API catalog that provides information regarding APIs in a standardized way, making the information machine-readable and presentable to users. In some implementations, API providers can provide or publish information about their APIs for inclusion in the API catalog. Machine-readable formats can include, for example, JSON.

In some implementations, the API catalog can be implemented as a centralized hub. The centralized hub can allow users to connect to different APIs that may have various (including proprietary) communication protocols. In some implementations, the API catalog can provide aggregated information so that users can obtain access to the APIs that may not be exposable in other ways. For example, some APIs may be in languages that some users are not able to understand. In this example, a common language is provided by the API catalog.

The API catalog can provide the following benefits: The discovery and consumption of APIs can be faster than in conventional systems in which many different protocols must be learned and discovery by developer and machines can be supported. Developers can build client libraries and IDE plugins; API owners can more easily engage with and grow their API communities; API consumers can receive API and event definitions with information about the supported authentication and API lifecycle information (e.g., version, latest-version, software version, and deprecation policies); public APIs can be exposed that do not require authentication to access resources; and taxonomy, interfaces, and services characteristics can be harmonized across various service providers and the harmonization can adhere to the representational state transfer (REST) harmonization guidelines from various groups.

Figure 3:
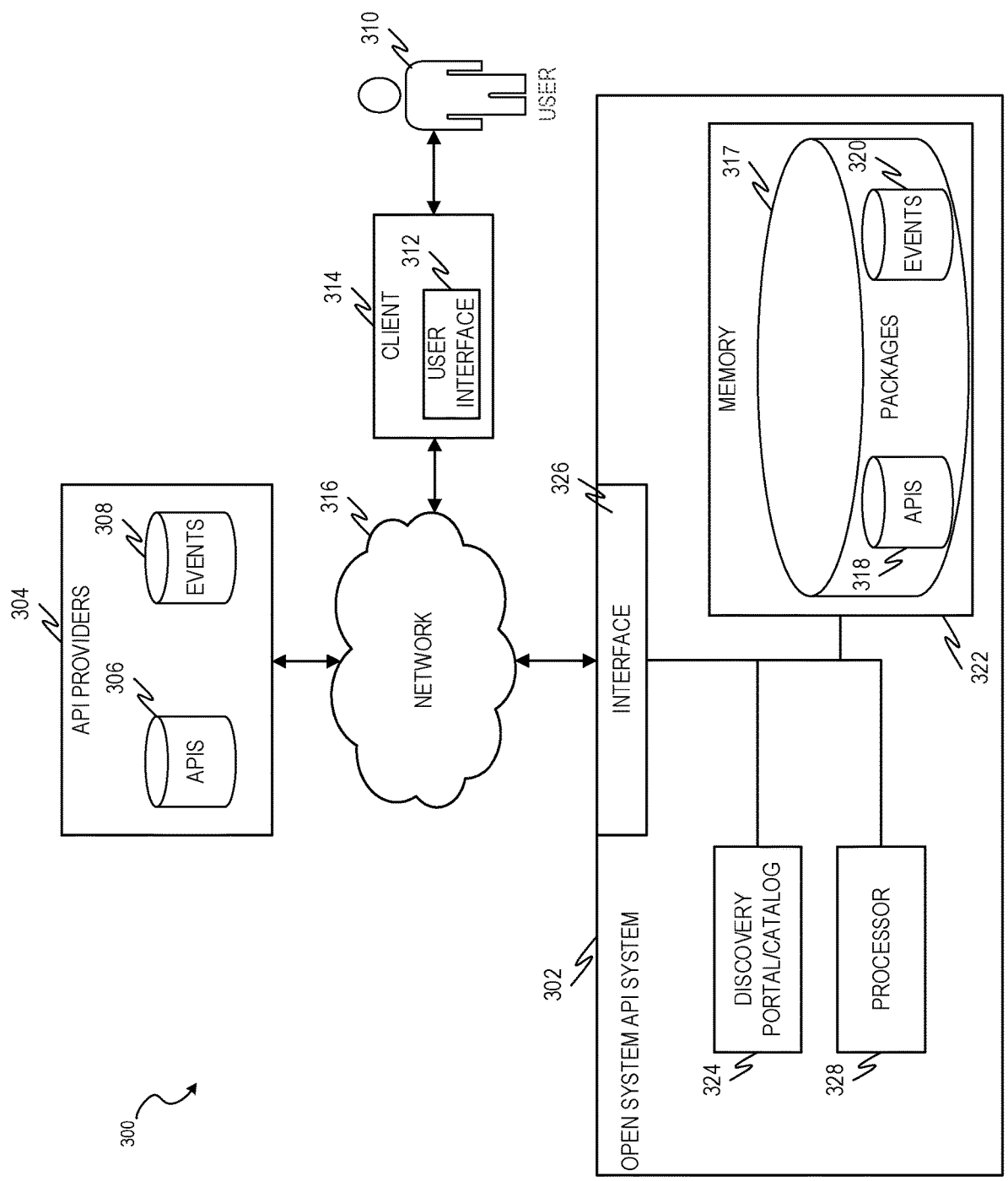
FIG. 3 is a block diagram of an example environment for providing open system Application Program Interfaces (APIs), in accordance with an example embodiment.

FIG. 3 is a block diagram of an example environment 300 for providing open system APIs, in accordance with an example embodiment. The environment 300 can support, search, discover, explore, and consume capabilities used by users, such as a user 310 for accessing APIs 306 and events 308 provided by API providers 304. The user 310 can access the APIs and events using a user interface (UI) 312. The UI 312 can be displayed on a client 314 (for example, a workstation used by the user 310 for application programming). Communications from the client 314 can pass through a network 316 (for example, the Internet and optionally one or more other networks).

An open API system 302 can use packages 317 to represent the APIs 306 and the events 308 of the API providers 304. The packages 317 can include APIs 318 and events 320 that are in a language and format supporting discovery by the users 310. The packages 317 can be included in memory 322, for example, serving as an API catalog. A discovery portal/catalog function 324 of the open API system 302 can perform search, discover, explore, and consume functions needed by the users 310. An interface 326 of the open API system 302 can receive requests received through the network 316 and transmit results in response to the requests. The requests can include API and event information received from the API providers 304. The requests can also include requests received from users, including to search, discover, explore, and consume information related to APIs and events.

The UI 312 can be associated with one or more applications that run on a client 314 (e.g., a mobile device, laptop computer, or other computing device) to interact with the open API system 302. The network 316 can support communication among the components of the environment 300. A processor 328 can execute instructions of modules and other components of the open API system 302.

Figure 4:
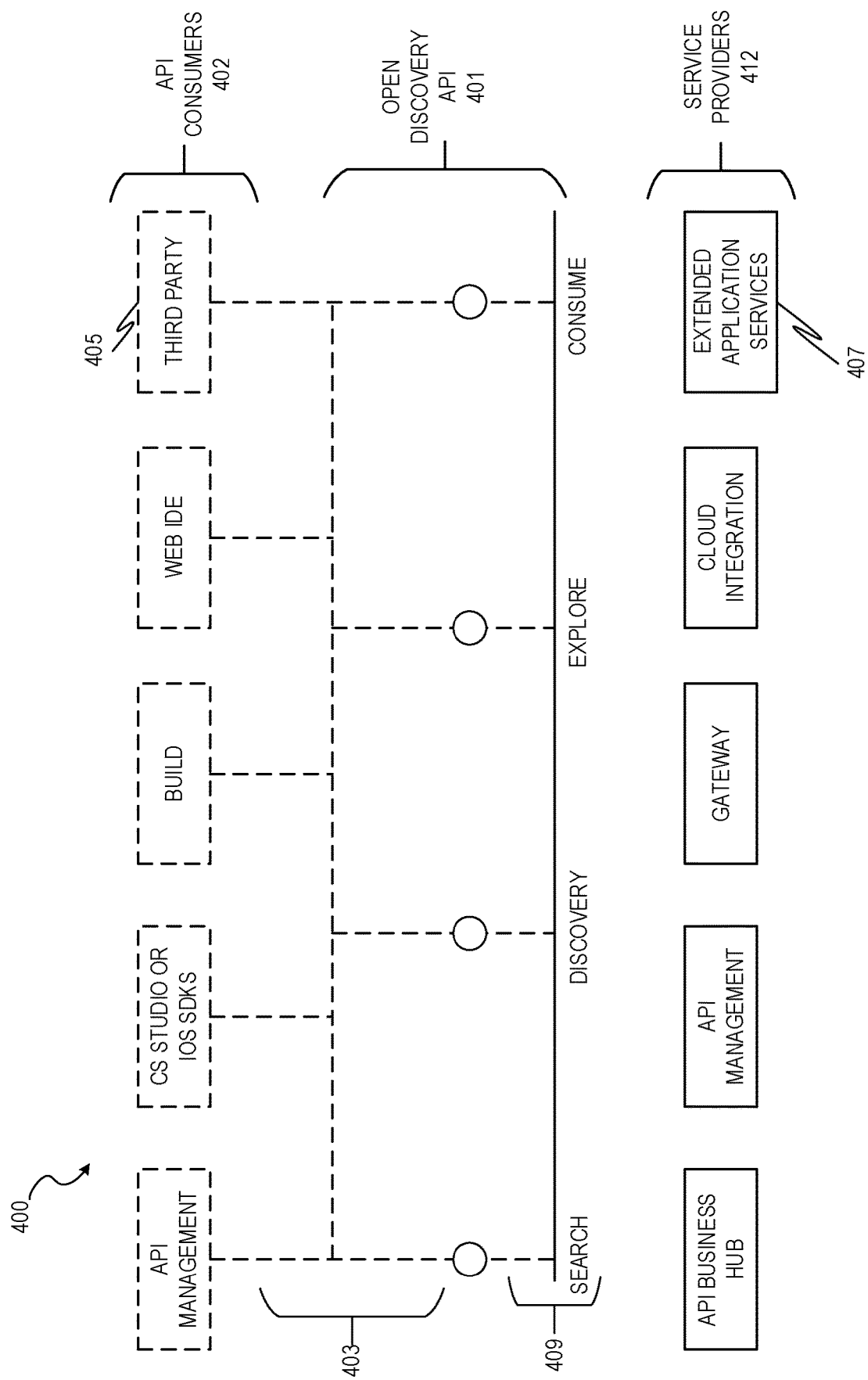
FIG. 4 is a block diagram of an example of an open consumer/provider architecture using open discovery API capabilities, in accordance with an example embodiment.

FIG. 4 is a block diagram of an example of an open consumer/provider architecture 400 using open discovery API capabilities, in accordance with an example embodiment. The open discovery API 401 provides a communication protocol 403 that is a simplified and standardized way for API consumers 402 to discover and communicate with API providers 412. This is an improvement over the several different communication protocols. The open consumer/provider architecture 400 also allows third-party consumers 405 to discover and communicate with the service providers 412. The open discovery API 401 also facilitates access to extended application services 407. The extended application services 407 can include, for example, an advanced model platform for the development and execution of microservice-oriented applications that take advantage of in-memory architecture and parallel execution capabilities provided by the extended application services 407. The open discovery API 401 can support developer and UI functions 409 including search, discover, explore, and consume capabilities.

Figure 5:
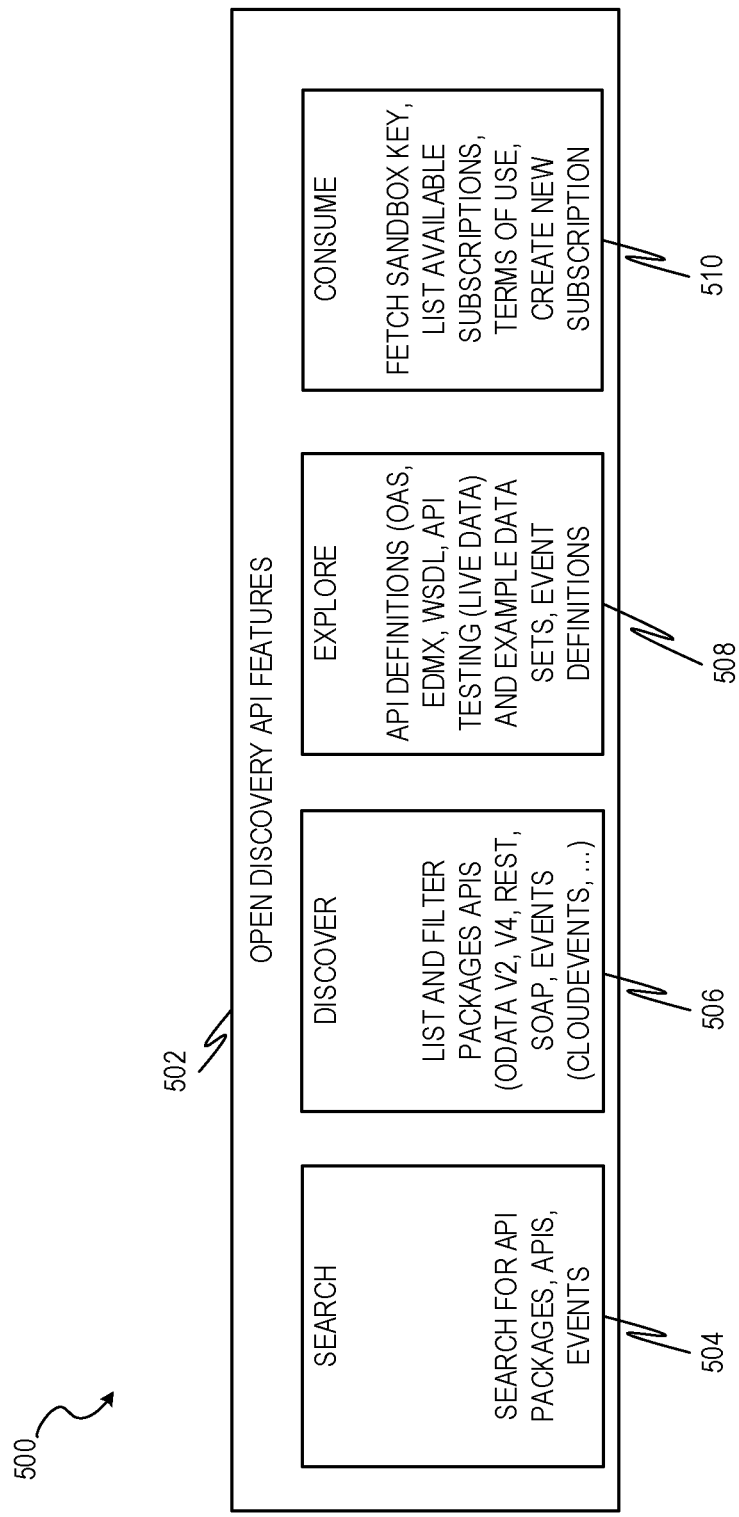
FIG. 5 is a block diagram showing examples of open discovery API features, in accordance with an example embodiment.

FIG. 5 is a block diagram 500 showing examples of open discovery API features 502, in accordance with an example embodiment. The open discovery API features 502 can allow users (or other API consumers) to search for, select, and implement APIs that are available from API providers. For example, the open discovery API features 502 can implement the developer and UI functions. A search feature 504, for example, can allow users to search for API packages, APIs, and events, such as by name or type. A discover feature 506, for example, can allow a user to list and filter packages, APIs, and events (for example, cloud events) in various ways. An explore feature 508, for example, can allow a user to find API definitions (for example, Open API Standard (OAS), Entity Data Model Designer (EDMD) for EDMX files, Web Services Description Language (WSDL), API testing and example data sets, and even definitions (for example, AsyncAPI). The explore feature 508 can make use of information from packages that group APIs by various features. The explore feature 508 can allow users to search for APIs using keywords, filter the results, and drill down to specific information for a given API. A consume feature 510, for example, can allow a user to fetch sandbox keys, list available subscriptions and terms of use, and create new subscriptions.

Figure 6:
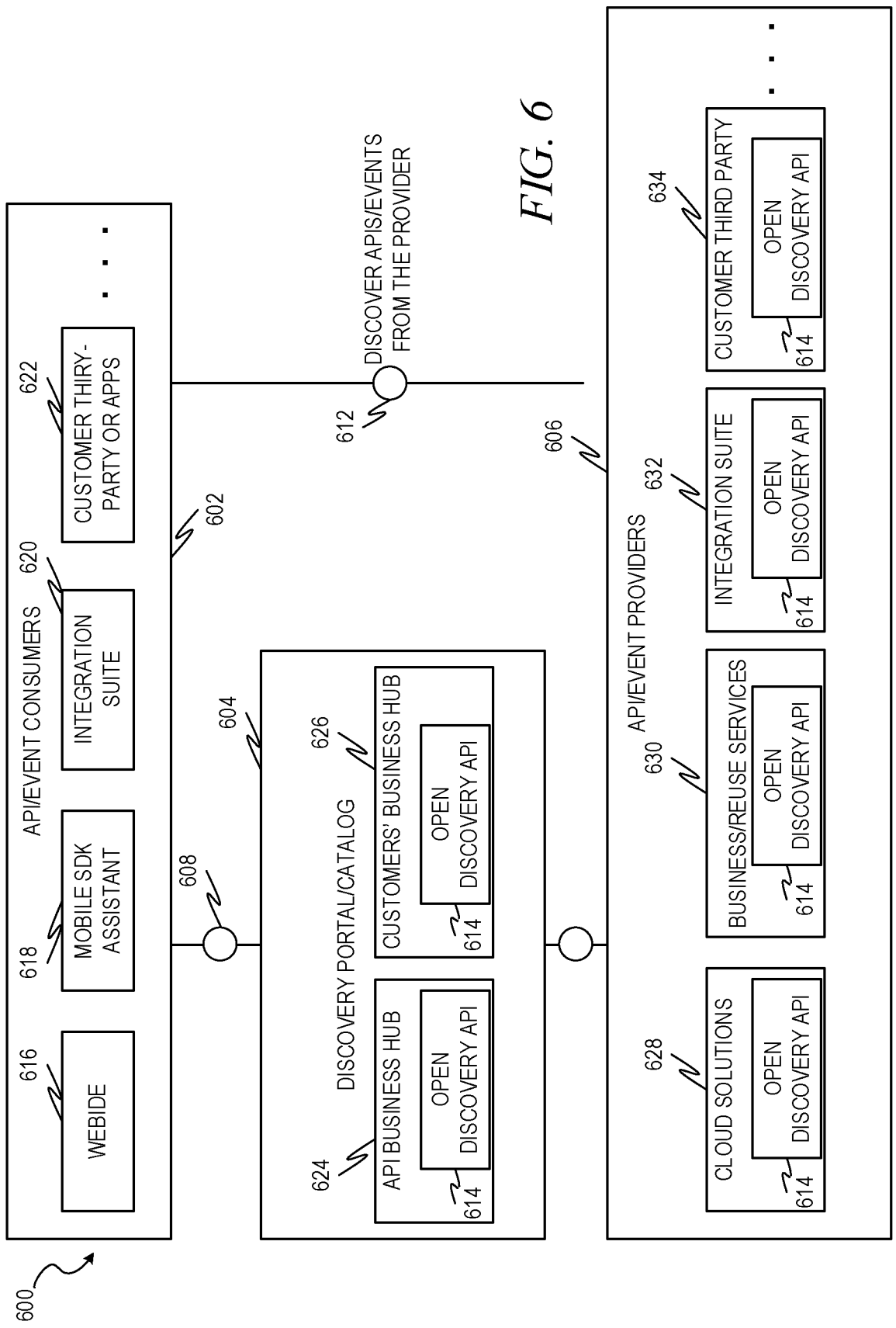
FIG. 6 is a block diagram showing an example of an architecture for open discovery API use, in accordance with an example embodiment.

FIG. 6 is a block diagram showing an example of an architecture 600 for open discovery API use, in accordance with an example embodiment. The architecture 600 can support API discovery and use in the cloud, for example, or in non-cloud networks. The architecture 600 can provide an open discoverable format used by API consumers to discover and use different kinds of APIs. Discovery can occur using the open discoverable format (for example, through a central repository), and subsequent use of the APIs can occur using the formats and communication protocols that are provided by the architecture 600. For example, the APIs of the different API providers can be exposed (for example, in a UI) in a common format that is easily digested by the user. Selection of an API by the user can cause an automatic import of the API-specific or API-proprietary format into the user's current context. For example, importing the API-specific or API-proprietary format can cause an addition to the user's application code, where the addition is a call to the API with the corresponding input and output parameters coded in the API-specific or API-proprietary format. Further, the security mechanisms that are needed to connect to the API can automatically be completed in the user's code. Security mechanisms can include, for example, API meta information such as security definitions and external links. In this way, the open API format aspects of the architecture 600 can initially serve as a bridge for the user, after which connections occur directly to the APIs of the API providers. After an initial handshake is accomplished using the connections, for example, the open API format can be skipped.

The architecture 600 includes API/event consumers 602 that can use a discovery portal/catalog 604 for access to API/event providers 606. Discovery 608 by the API/event consumers 602 that uses the discovery portal/catalog 604 can include, for example, discovery of APIs and events published by system or by customers. The discovery also relies on published APIs and events published by the API/event providers 606. After discovery, API/event consumers 602 can access the API/event providers 606 directly. Discovery by the API/event consumers 602 can also include direct discovery 612 using APIs and events published by the API/event providers 606. Components of the API/event consumers 602, the discovery portal/catalog 604, and the API/event providers 606 include open discovery API 614 components that provide the open API capabilities.

The API/event consumers 602 can include, for example, WebIDE tools 616, mobile SDK assistant tools 618, integration suite tools 620, and customer third-party tools or applications 622. The discovery portal/catalog 604 can include, for example, an API business hub 624 and customers' business hubs 626. The API/event providers 606 can include, for example, cloud solutions 628, business reuse services 630, integration suites 632, and customer/third-party APIs and events 634.

Packages can be used to group APIs by tag, for example, by API type. Tags can include, for example, product, line of business, industry, and country.

One technical issue that arises with such implementations is that it can be difficult for applications, such as those operated by API/event consumers 602, to implement, because it mandates that a complicated API interface be used, which places a lot of implementation effort on the applications themselves. In an example embodiment, this technical issue is solved by decomposing resource discovery roles, parts, and transport modes into more individualized entities that allow for resource information sharing without complicated API interfaces to be implemented by the applications. More particularly the information that needs to be defined is decoupled from how this information is transported.

In an example embodiment, three roles are defined for resource discovery: provider, aggregator, and consumer. The provider is the one whose resource information will be shared. Rather than the provider needing to implement the complicated API, however, an aggregator may provide that role. The ORD specification defines and standardizes the API for providers. Based on this API, the aggregator is able to gather resource information from potentially multiple providers (and also, in some embodiments, other aggregators). The consumer then accesses the aggregator to obtain resource information rather than directly accessing the provider.

This new architecture also permits consumer interfaces to be added and changed without having an impact on the provider-side.

Figure 7:
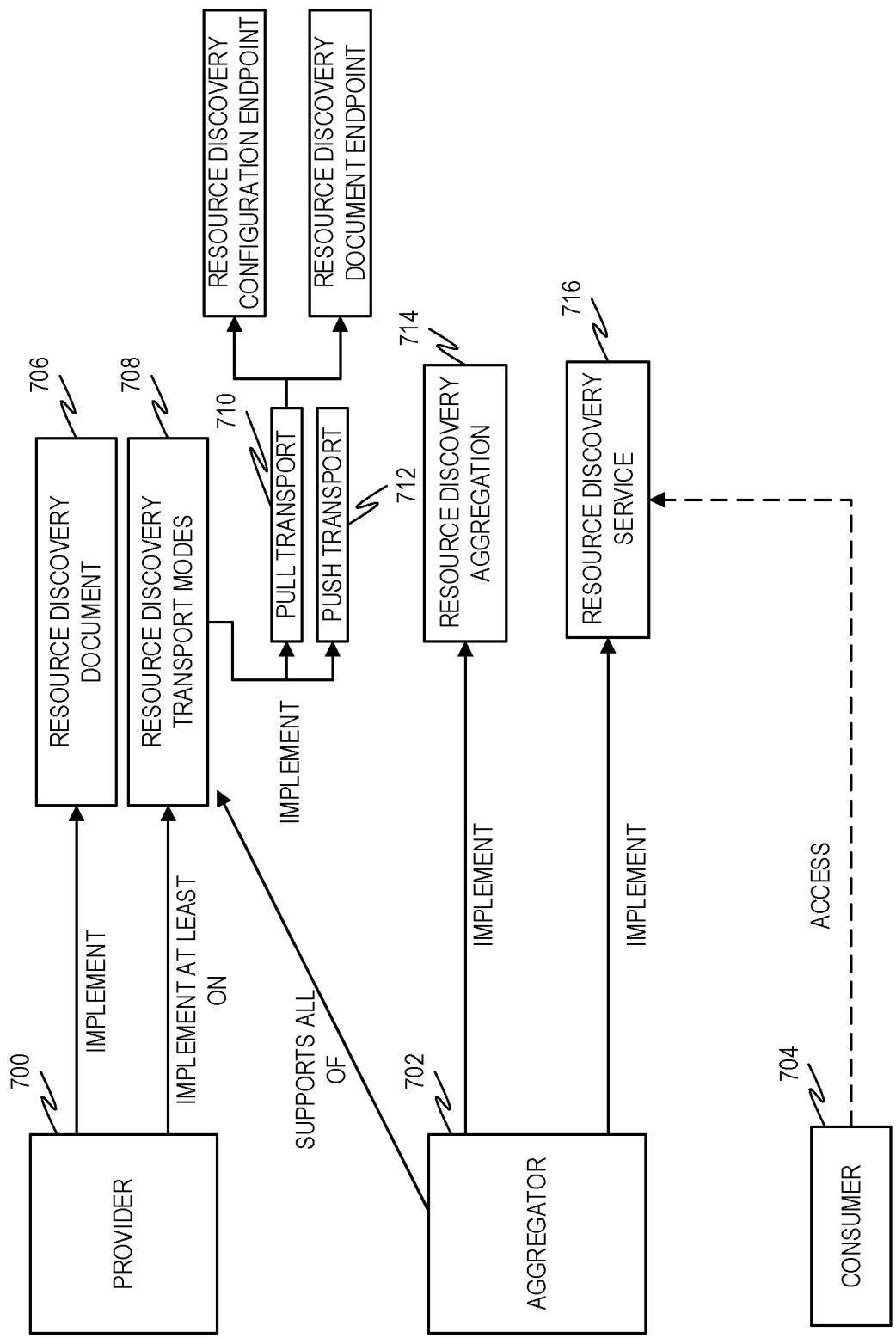
FIG. 7 is a block diagram illustrating the relationships between resource discovery roles and parts, in accordance with an example embodiment.

FIG. 7 is a block diagram illustrating the relationships between resource discovery roles and parts, in accordance with an example embodiment. Here, as described above, the three roles are provider 700, aggregator 702, and consumer 704. The parts include a resource discovery document 706, resource discovery transport modes 708 (which includes both pull transport 710 and push transport 712), resource discovery aggregation 714 (which includes rules and validation), and resource discovery service 716. The provider 700 implements the resource discovery document 706 and at least one of the transport modes 708. The aggregator supports all the transport modes 708 and implements the resource discovery aggregation 714 and resource discovery service 716. The consumer 704 then accesses the resource discovery service 716. Notably, the provider 700 does not need to implement either the resource discovery aggregation 714 or resource discovery service 716, simplifying the implementation greatly for the provider 700.

The provider 700 provides a high-level, combined view of the exposed resources (e.g., APIs, events) in the described system instance. This may be implemented by using a configuration, located at a uniform resource identifier (URI), along with one or more resource discovery documents 706. This makes the metadata of the provider's 700 system crawlable and navigable. The provider 700 defines a standardized endpoint with a location that is known to aggregators 702. A definition file is then stored at this standardized endpoint. In an example embodiment, the definition file is a JSON file.

More particularly, each resource discovery document may contribute information about the machine-readable system landscape metadata view, which indicates, for example, how a consumer finds out which APIs are available for integration, which APIs are available, whether the APIs are customizable (or have been customized already), and if so, how they look for each specific tenant. This information is provided at runtime, potentially reflecting tenant-specific customizations to the APIs.

The aggregator 702 collects, aggregates, and proxies the resource discovery information from potentially multiple providers 700 and other aggregators 702. This may be performed within the context of tenants, zones, and accounts. The aggregator 702 reflects the combined information of many system instances, which allows a system landscape view. The aggregator exposes the information through a high-quality API called the resource discovery service 716, which enriches the response with information from other sources.

The consumer 704 discovers the exposed resources of a given system or a combined system landscape; it obtains machine-readable metadata.

The pull transport 710 defines how the aggregator 702 requests resource discovery information from provider 700, while the push transport 712 defines how the provider 700 can push the resource discovery information to the aggregator(s) 702 without formal request, such as by a subscription service. Other possible transports may include event-driven transports.

Resource discovery components at each provider provide resource discovery information to requesting entities/processes, in this case aggregators. Resource discovery information can have different scopes of views. System instance aware information describes the state of a specific system instance at runtime, potentially reflecting customizations. System instance aware information may differ between system instances, depending on the tenant specific customizability of them. System instance unaware information, on the other hand, is identical across all system instances of the described system type. Cross-system information is shared between multiple system types. Most notably, this applies to a resource discovery taxonomy.

Resource discovery information can also be categorized into resources and taxonomies. Resource discovery resource information describes application and service resources, such as API resources and event resources. It may also be system instance aware, depending on the implementation of the system type.

The resource discovery taxonomy is used to categorize and structure resources. Taxonomies span across products and system types, and thus may be considered cross-system information. Some taxonomies may be implemented as dedicated entities that can express additional information, while other taxonomies are provided via fixed enums (code lists) and are defined as part of resource discovery itself, such as tags.

Resource discovery behavior standardizes how resource discovery information is discovered, transported, and aggregated.

A system type is an abstract type of an application or service. A system installation is a concrete running instance of a system type. If the system type supports tenant isolation, a system installation may offer multiple system instances.

A resource is provided by or for a system instance for outside consumption and/or communication. As such, the resource discovery components may be considered resources in this context, although under some circumstances, they may be considered system instances or installations.

As mentioned above, there are multiple ways the resource discovery components can communicate with aggregators. One way is a pull transport mode. Here, resource discovery information is made available through a REST API that exposes resource discovery documents via endpoints. This has the benefit of a decentralized approach, but periodic polling can reduce operational efficiency, slowing information updates. Another potential approach is a push transport, where the document is pushed to a requester via a webhook, a Hypertext Transfer Protocol (HTTP) POST endpoint, or a file upload. Another potential approach is an import transport, where a resource discovery document is stored as a JSON file. Another potential approach is event-driven transport, which uses a publish/subscribe or distributed log pattern.

Figure 8:
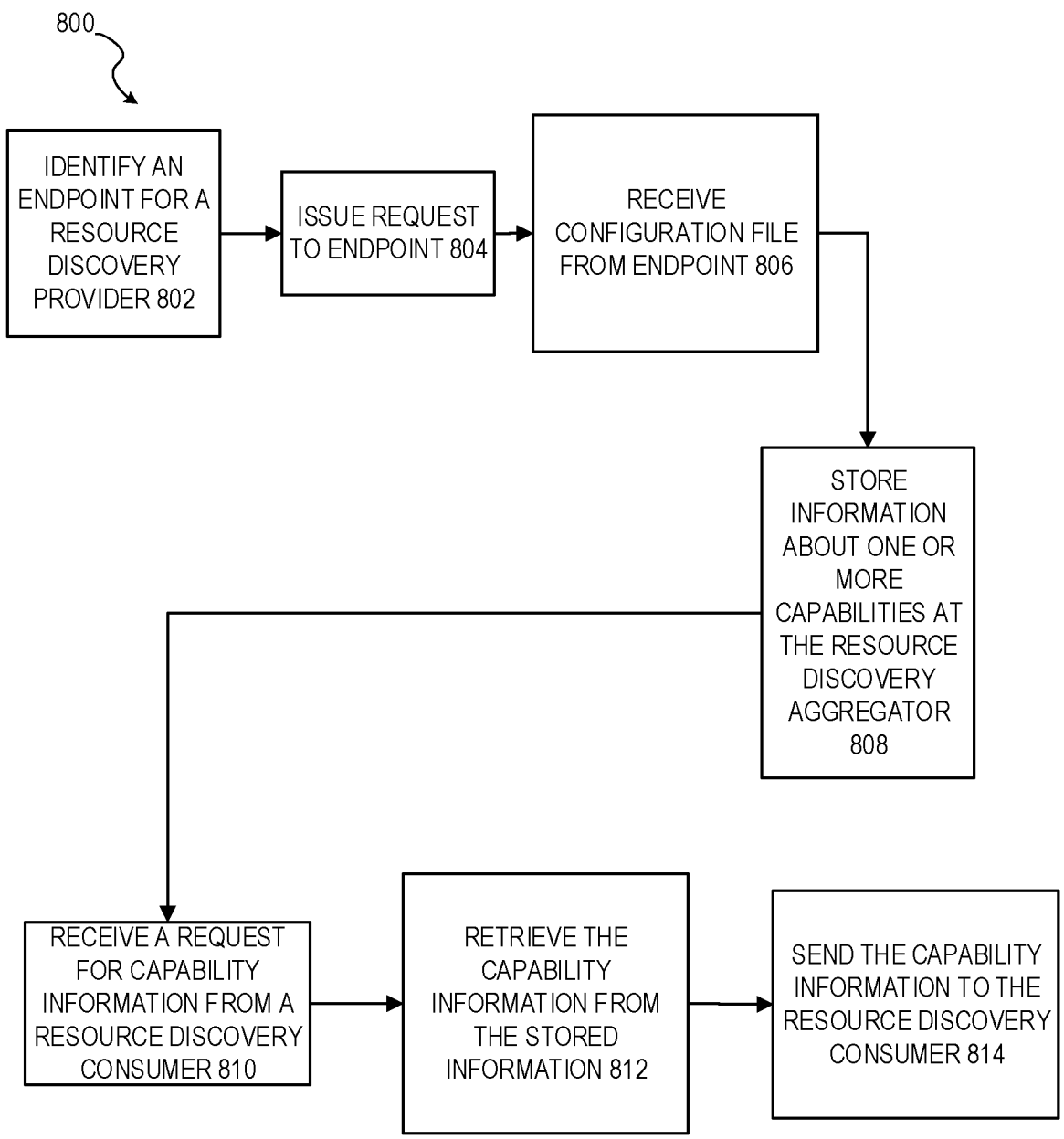
FIG. 8 is flow diagram illustrating a method 800 for resource discovery in a computer system, in accordance with an example embodiment.

FIG. 8 is flow diagram illustrating a method 800 for resource discovery in a computer system, in accordance with an example embodiment. The method 800 may be performed by a resource discovery aggregator. At operation 802, an endpoint for a resource discovery provider is identified. This may be performed by accessing a well-known URI registry to identify a registered URI for the endpoint. At operation 804, a request to the endpoint is issued. This may be an HTTP GET command. At operation 806, in response to the issuing of the request, a configuration file is received from the endpoint. The configuration file identifies one or more capabilities of the endpoint. This may include describing information about the capabilities within the configuration file, but alternatively can include merely identifying a separate resource definition file that contains the information about the capabilities. This separate resource definition file may be in a standardized format, such as JSON.

At operation 808, information regarding the one or more capabilities are stored at the resource discovery aggregator. At operation 810, a request for capability information is received from a resource discovery consumer. At operation 812, in response to the receiving, the capability information is retrieved from the stored information. Finally, at operation 814, the capability information is sent to the resource discovery consumer.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
at least one hardware processor; and
a computer-readable medium storing instructions that, when executed by the at least one hardware processor, cause the at least one hardware processor to perform operations comprising, at a resource discovery aggregator:
identifying an endpoint for a resource discovery provider;
issuing a request to the endpoint;
in response to the issuing of the request, receiving a configuration file from the endpoint, the configuration file identifying one or more capabilities of the endpoint;
storing, at the resource discovery aggregator, information regarding the one or more capabilities;
receiving, from a resource discovery consumer, a request for capability information;
in response to the receiving, retrieving the capability information from the stored information; and
sending the capability information to the resource discovery consumer.

Example 2. The system of Example 1, wherein the information about the one or more capabilities is contained in a capability definition file referenced by the configuration file, and wherein the operations further comprise retrieving the information from the capability definition file based on the configuration file.

Example 3. The system of Example 2, wherein the capability definition file has a document structure defined by a standardized definition type.

Example 4. The system of Example 3, wherein the capability definition file is in Javascript Object Notation (JSON) format.

Example 5. The system of any of Examples 1-4, wherein the one or more capabilities are passive capabilities.

Example 6. The system of Example 5, wherein the configuration file further identifies one or more resource discovery documents, each of the one or more resource discovery documents indicating one or more active capabilities of the resource discovery provider, and wherein the operations further comprise: including information about the one or more active capabilities, retrieved from the one or more resource discovery documents, in the capability information sent to the resource discovery consumer.

Example 7. The system of any of Examples 1-6, wherein the one or more capabilities include at least two separate capabilities having overlapping requirements.

Example 8. A method comprising, at a resource discovery aggregator:
at a resource discovery aggregator:
identifying an endpoint for a resource discovery provider;
issuing a request to the endpoint;
in response the issuing of the request, receiving a configuration file from the endpoint, the configuration file identifying one or more capabilities of the endpoint;
storing, at the resource discovery aggregator, information regarding the one or more capabilities;
receiving, from a resource discovery consumer, a request for capability information;
in response to the receiving, retrieving the capability information from the stored information; and
sending the capability information to the resource discovery consumer.

Example 9. The system of Example 8, wherein the information about the one or more capabilities is contained in a capability definition file referenced by the configuration file, and wherein the operations further comprise retrieving the information from the capability definition file based on the configuration file.

Example 10. The system of Example 9, wherein the capability definition file has a document structure defined by a standardized definition type.

Example 11. The system of Example 10, wherein the capability definition file is in Javascript Object Notation (JSON) format.

Example 12. The system of any of Examples 8-11, wherein the one or more capabilities are passive capabilities.

Example 13. The system of Example 12, wherein the configuration file further identifies one or more resource discovery documents, each of the one or more resource discovery documents indicating one or more active capabilities of the resource discovery provider, and wherein the operations further comprise: including information about the one or more active capabilities, retrieved from the one or more resource discovery documents, in the capability information sent to the resource discovery consumer.

Example 14. The system of any of Examples 8-13, wherein the one or more capabilities include at least two separate capabilities having overlapping requirements.

Example 15. A non-transitory machine-readable medium storing instructions which, when executed by one or more processors, cause the one or more processors to perform operations comprising, at a resource discovery aggregator:
  identifying an endpoint for a resource discovery provider;
  issuing a request to the endpoint;
  in response the issuing of the request, receiving a configuration file from the endpoint, the configuration file identifying one or more capabilities of the endpoint;
  storing, at the resource discovery aggregator, information regarding the one or more capabilities;
  receiving, from a resource discovery consumer, a request for capability information;
  in response to the receiving, retrieving the capability information from the stored information; and
  sending the capability information to the resource discovery consumer.

Example 16. The non-transitory machine-readable medium of Example 15, wherein the information about the one or more capabilities is contained in a capability definition file referenced by the configuration file, and wherein the operations further comprise retrieving the information from the capability definition file based on the configuration file.

Example 17. The non-transitory machine-readable medium of Example 16, wherein the capability definition file has a document structure defined by a standardized definition type.

Example 18. The non-transitory machine-readable medium of Example 17, wherein the capability definition file is in Javascript Object Notation (JSON) format.

Example 19. The non-transitory machine-readable medium of any of Examples 15-18, wherein the one or more capabilities are passive capabilities.

Example 20. The non-transitory machine-readable medium of Example 19, wherein the configuration file further identifies one or more resource discovery documents, each of the one or more resource discovery documents indicating one or more active capabilities of the resource discovery provider, and wherein the operations further comprise: including information about the one or more active capabilities, retrieved from the one or more resource discovery documents, in the capability information sent to the resource discovery consumer.

Figure 9:
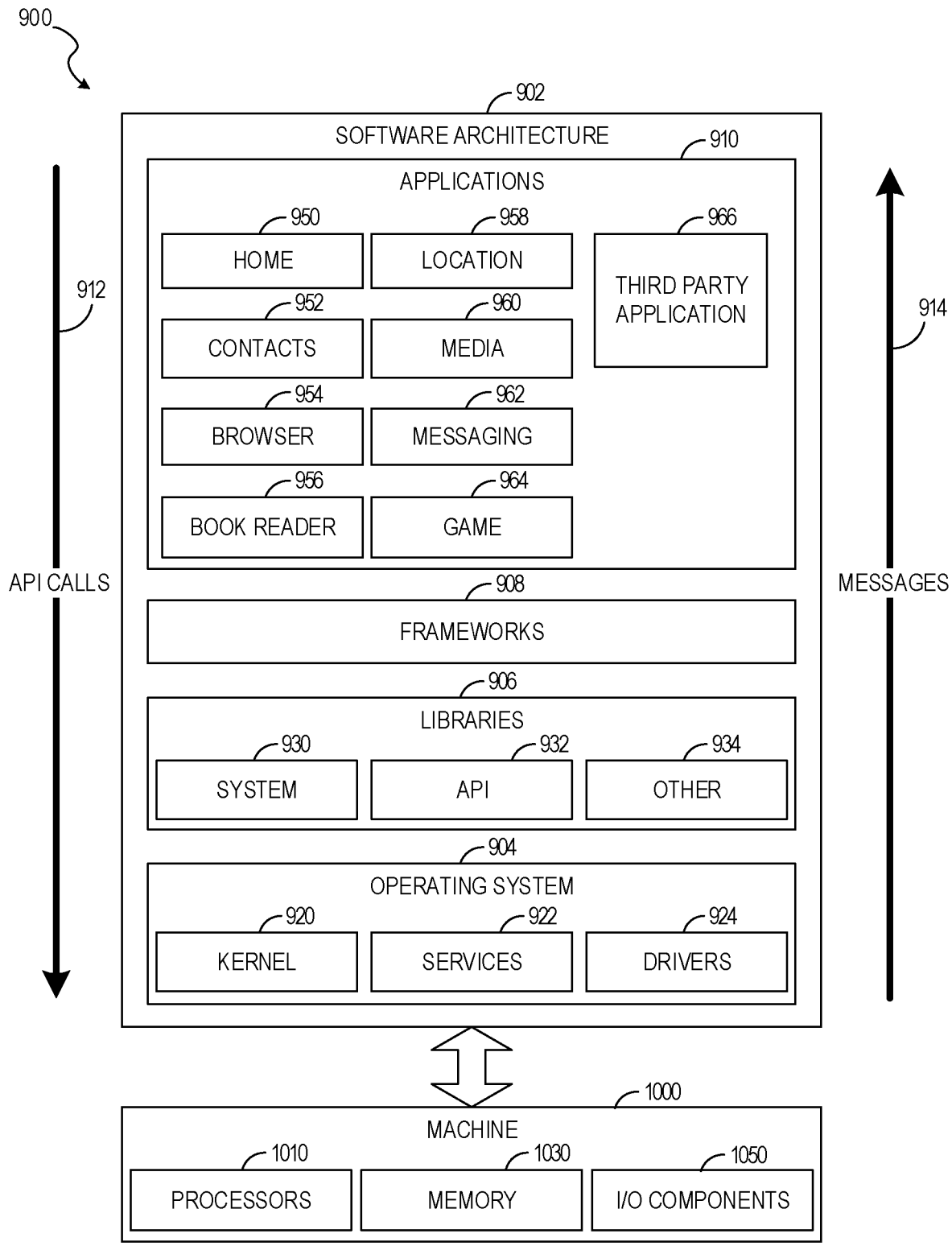
FIG. 9 is a block diagram illustrating a software architecture, which can be installed on any one or more of the devices described above.

FIG. 9 is a block diagram 900 illustrating a software architecture 902, which can be installed on any one or more of the devices described above. FIG. 9 is merely a non-limiting example of a software architecture, and it will be appreciated that many other architectures can be implemented to facilitate the functionality described herein. In various embodiments, the software architecture 902 is implemented by hardware such as a machine 1000 of FIG. 10 that includes processors 1010, memory 1030, and input/output (I/O) components 1050. In this example architecture, the software architecture 902 of FIG. 9 can be conceptualized as a stack of layers where each layer may provide a particular functionality. For example, the software architecture 902 includes layers such as an operating system 904, libraries 906, frameworks 908, and applications 910. Operationally, the applications 910 invoke Application Program Interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionalities. The services 922 can provide other common services for the other software layers. The drivers 924 are responsible for controlling or interfacing with the underlying hardware. For instance, the drivers 924 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910. For example, the frameworks 908 provide various graphical user interface (GUI) functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications, such as a third-party application 966. The applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 966 can invoke the API calls 912 provided by the operating system 1004 to facilitate functionality described herein.

Figure 10:
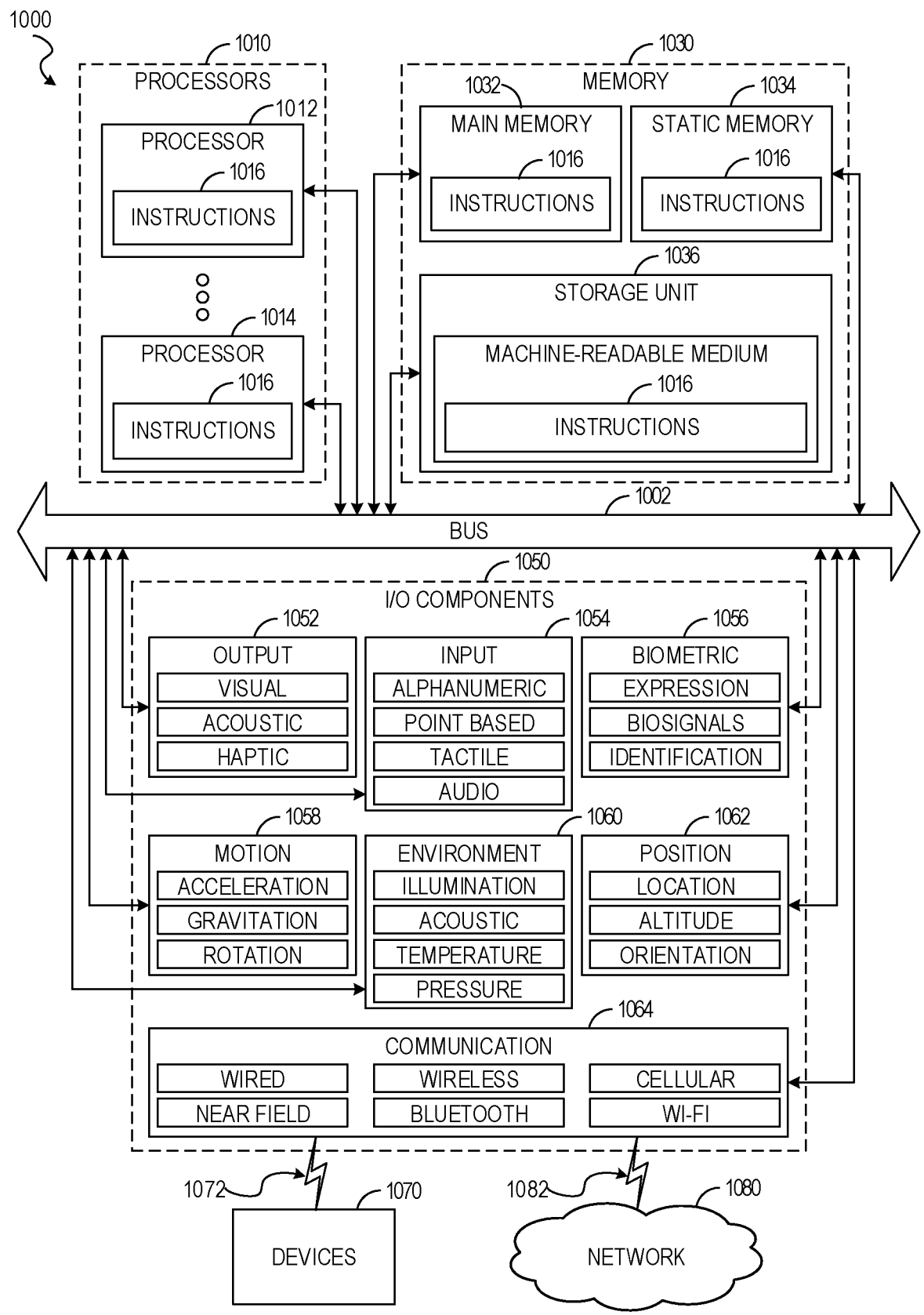
FIG. 10 illustrates a diagrammatic representation of a machine in the form of a computer system within which a set of instructions may be executed for causing the machine to perform any one or more of the methodologies discussed herein.

FIG. 10 illustrates a diagrammatic representation of a machine 1000 in the form of a computer system within which a set of instructions may be executed for causing the machine 1000 to perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute the method of FIG. 8. Additionally, or alternatively, the instructions 1016 may implement FIGS. 1-8 and so forth. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions 1016 contemporaneously. Although FIG. 10 shows multiple processors 1010, the machine 1000 may include a single processor 1012 with a single core, a single processor 1012 with multiple cores (e.g., a multi-core processor 1012), multiple processors 1012, 1014 with a single core, multiple processors 1012, 1014 with multiple cores, or any combination thereof.

The memory 1030 may include a main memory 1032, a static memory 1034, and a storage unit 1036, each accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., coupled via a USB).

Moreover, the communication components 1064 may detect identifiers or include components operable to detect identifiers. For example, the communication components 1064 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

The various memories (i.e., 1030, 1032, 1034, and/or memory of the processor(s) 1010) and/or the storage unit 1036 may store one or more sets of instructions 1016 and data structures (e.g., software) embodying or utilized by any one or more of the methodologies or functions described herein. These instructions (e.g., the instructions 1016), when executed by the processor(s) 1010, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of several well-known transfer protocols (e.g., HTTP). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a non-transitory computer-readable medium storing instructions that, when executed by the at least one hardware processor, cause the at least one hardware processor to perform operations comprising, at a resource discovery aggregator:
   identifying an endpoint for a resource discovery provider;
   issuing a request to the endpoint;
   in response to the issuing of the request, receiving a configuration file from the endpoint, the configuration file identifying one or more capabilities of the endpoint, the one or more capabilities including active capabilities and passive capabilities, the active capabilities involving invoking or controlling behavior and the passive capabilities involving retrieval of information;
   storing, at the resource discovery aggregator, information regarding the passive capabilities but not the active capabilities;
   receiving, from a resource discovery consumer, a request for capability information;
   in response to the receiving, retrieving the capability information from the stored information; and
   sending the capability information to the resource discovery consumer.

2. The system of claim 1, wherein the information about the one or more capabilities is contained in a capability definition file referenced by the configuration file; and
   wherein the operations further comprise retrieving the information from the capability definition file based on the configuration file.

3. The system of claim 2, wherein the capability definition file has a document structure defined by a standardized definition type.

4. The system of claim 3, wherein the capability definition file is in Javascript Object Notation (JSON) format.

5. The system of claim 1, wherein the passive capabilities are stored in an Open Resource Discovery (ORD) document while the active capabilities are separately maintained as a Service Provider Interface (SPI).

6. The system of claim 5, wherein the configuration file further identifies one or more resource discovery documents.

7. The system of claim 1, wherein the one or more capabilities include at least two separate capabilities having overlapping requirements.

8. A method comprising, at a resource discovery aggregator:
   identifying an endpoint for a resource discovery provider;
   issuing a request to the endpoint;
   in response to the issuing of the request, receiving a configuration file from the endpoint, the configuration file identifying one or more capabilities of the endpoint, the one or more capabilities including active capabilities and passive capabilities, the active capabilities involving invoking or controlling behavior and the passive capabilities involving retrieval of information;
   storing, at the resource discovery aggregator, information regarding the passive capabilities but not the active capabilities;
   receiving, from a resource discovery consumer, a request for capability information;
   in response to the receiving, retrieving the capability information from the stored information; and
   sending the capability information to the resource discovery consumer.

9. The method of claim 8, wherein the information about the one or more capabilities is contained in a capability definition file referenced by the configuration file, the method further comprising retrieving the information from the capability definition file based on the configuration file.

10. The method of claim 9, wherein the capability definition file has a document structure defined by a standardized definition type.

11. The method of claim 10, wherein the capability definition file is in Javascript Object Notation (JSON) format.

12. The method of claim 8, wherein the passive capabilities are stored in an Open Resource Discovery (ORD) document while the active capabilities are separately maintained as a Service Provider Interface (SPI).

13. The method of claim 12, wherein the configuration file further identifies one or more resource discovery documents.

14. The method of claim 8, wherein the one or more capabilities include at least two separate capabilities having overlapping requirements.

15. A non-transitory machine-readable medium storing instructions which, when executed by one or more processors, cause the one or more processors to perform operations comprising, at a resource discovery aggregator:
   identifying an endpoint for a resource discovery provider;
   issuing a request to the endpoint;
   in response to the issuing of the request, receiving a configuration file from the endpoint, the configuration file identifying one or more capabilities of the endpoint, the one or more capabilities including active capabilities and passive capabilities, the active capabilities involving invoking or controlling behavior and the passive capabilities involving retrieval of information;
   storing, at the resource discovery aggregator, information regarding the passive capabilities but not the active capabilities;
   receiving, from a resource discovery consumer, a request for capability information;
   in response to the receiving, retrieving the capability information from the stored information; and
   sending the capability information to the resource discovery consumer.

16. The non-transitory machine-readable medium of claim 15, wherein the information about the one or more capabilities is contained in a capability definition file referenced by the configuration file; and
   wherein the operations further comprise retrieving the information from the capability definition file based on the configuration file.

17. The non-transitory machine-readable medium of claim 16, wherein the capability definition file has a document structure defined by a standardized definition type.

18. The non-transitory machine-readable medium of claim 17, wherein the capability definition file is in Javascript Object Notation (JSON) format.

19. The non-transitory machine-readable medium of claim 15, wherein the passive capabilities are stored in an Open Resource Discovery (ORD) document while the active capabilities are separately maintained as a Service Provider Interface (SPI).

20. The non-transitory machine-readable medium of claim 19, wherein the configuration file further identifies one or more resource discovery documents.

* * * * *